United States Patent [19]

Dierks et al.

[11] Patent Number: 5,667,231
[45] Date of Patent: Sep. 16, 1997

[54] TRAILER

[75] Inventors: Dale J. Dierks; A. Dean Oehlerking; Ray E. Paradis; Harry E. Voelzke, all of Mitchell, S. Dak.

[73] Assignee: Dakota Mfg. Co., Inc., Mitchell, S. Dak.

[21] Appl. No.: 528,323

[22] Filed: Sep. 14, 1995

[51] Int. Cl.$^6$ .................................. B62D 33/08; B60P 1/04
[52] U.S. Cl. ........................ 280/149.2; 280/781; 414/475; 414/483; 414/917
[58] Field of Search ........................ 280/405.1, 781, 280/787, 788, 799, 149.2, 407.1; 414/474, 475, 476, 483, 481, 917

[56] References Cited

U.S. PATENT DOCUMENTS

| | | | |
|---|---|---|---|
| 2,717,707 | 9/1955 | Martin | 280/149.2 |
| 3,894,645 | 7/1975 | Verschage | 414/481 |
| 4,000,913 | 1/1977 | Gibson | 280/704 |
| 4,164,297 | 8/1979 | Dorwin | 414/481 |
| 4,166,640 | 9/1979 | Van Denberg | 280/711 |
| 4,568,235 | 2/1986 | Bills | 280/149.2 |
| 5,013,056 | 5/1991 | Landoll et al. | 280/149.2 |
| 5,037,126 | 8/1991 | Gottschalk et al. | 280/688 |
| 5,171,036 | 12/1992 | Ross | 280/713 |
| 5,211,413 | 5/1993 | Williams et al. | 280/149.2 |
| 5,366,237 | 11/1994 | Dilling et al. | 280/711 |
| 5,378,006 | 1/1995 | Stuart et al. | 280/149.2 |

FOREIGN PATENT DOCUMENTS 2544700  10/1984  France ....................... 414/475

Primary Examiner—Paul N. Dickson
Attorney, Agent, or Firm—Zarley, McKee, Thomte Voorhees & Sease; Dennis L. Thomte

[57] ABSTRACT

A trailer comprising a wheeled frame including a main deck and an upper deck positioned thereon. The rearward end of the upper deck is pivotally interconnected to the forward end of the main deck by multiple arms which maintain the upper deck in a substantially horizontal position while the main deck is being pivoted with respect to the upper deck. A suspension system is slidably mounted on the wheeled frame and is slidably movable from a transport position to a tilt position forwardly therefrom to enable the main deck to be pivoted so that the rearward end of the main deck may be moved into ground engagement to enable equipment or the like to be mounted on the trailer.

4 Claims, 5 Drawing Sheets

TRAILER

BACKGROUND OF THE INVENTION

1. Field of the Invention

This invention relates to an equipment trailer and more particularly to a trailer designed to transport large equipment such as pavers, semi-mounted equipment, buses, trucks, rollers, sweepers, trenchers, etc. More particularly, this invention relates to a trailer having a main deck and an upper deck with means pivotally interconnecting the same. More particularly, this invention relates to a trailer wherein the suspension system for the trailer may be slidably moved forward from a transport position to a position wherein the main deck of the trailer may be pivotally moved, with respect to the upper deck, so that the rearward end of the main deck is in ground engagement to enable the equipment to be loaded onto the trailer or unloaded therefrom.

2. Description of the Related Art

Many types of trailers have been previously provided for transporting large equipment over-the-road. The equipment is normally loaded onto the trailer from the rearward end thereof. Folding ramps or the like have sometimes been provided at the rear ends of the trailers to enable the equipment to move onto the trailer bed. In some cases, the bed of the trailer is tilted to move the rearward end thereof into close proximity to the ground to enable the equipment to move or to be moved onto the trailer. A problem associated with both the folding ramp design and the tilting trailer bed is that the angle of the same is quite large, thereby making it difficult, if not impossible, for the equipment to be loaded onto the trailer.

In an effort to solve the problems of the prior art, a low angle tilt trailer was designed and is described in U.S. Pat. No. 4,568,235, which has been assigned to the assignor of this invention. Although the trailer of the above-identified patent truly represented a significant advance in the art, it has been found that significant improvements can be made thereto which are the subject of this invention. In particular, the instant invention includes an improved means for slidably adjusting the suspension system of the trailer to enable the main deck of the trailer to be pivotally moved so that the rearward end thereof will be in ground engagement to enable the equipment to be loaded onto the trailer. Further, means has been provided in this invention to maintain the upper deck substantially level when the main deck is pivotally moved with respect thereto.

SUMMARY OF THE INVENTION

A trailer is disclosed comprising a wheeled frame including a main deck and an upper deck positioned thereon. The rearward end of the upper deck is operatively pivotally interconnected to the forward end of the main deck by multiple arms which maintain the upper deck in a substantially horizontal position while the main deck is being pivoted with respect to the upper deck. A suspension system is slidably mounted on the wheeled frame and is slidably movable from a transport position to a tilt position forwardly therefrom to enable the main deck to be pivoted so that the rearward end of the main deck will be moved into ground engagement to enable equipment or the like to be mounted on the trailer.

It is therefore a principal object of the invention to provide an improved trailer.

A further object of the invention is to provide an improved trailer including a main deck and an upper deck including means which pivotally interconnects the forward end of the main deck to the rearward end of the upper deck in such a way so that the upper deck remains substantially horizontal when the main deck is pivoted to its tilt position.

Still another object of the invention is to provide a trailer including an improved suspension which may be slidably moved forwardly from a transport position to a tilt position so that the main deck of the trailer may be pivotally moved to a loading or unloading position.

Still another object of the invention is to provide a trailer including a slidable suspension means having low friction means positioned between the suspension means and the frame of the trailer.

Still another object of the invention is to provide a trailer including means interconnecting the upper deck and the main deck which also serves as a deck ramp.

These and other objects will be apparent to those skilled in the art.

DESCRIPTION OF THE PREFERRED EMBODIMENT

Figure 1:
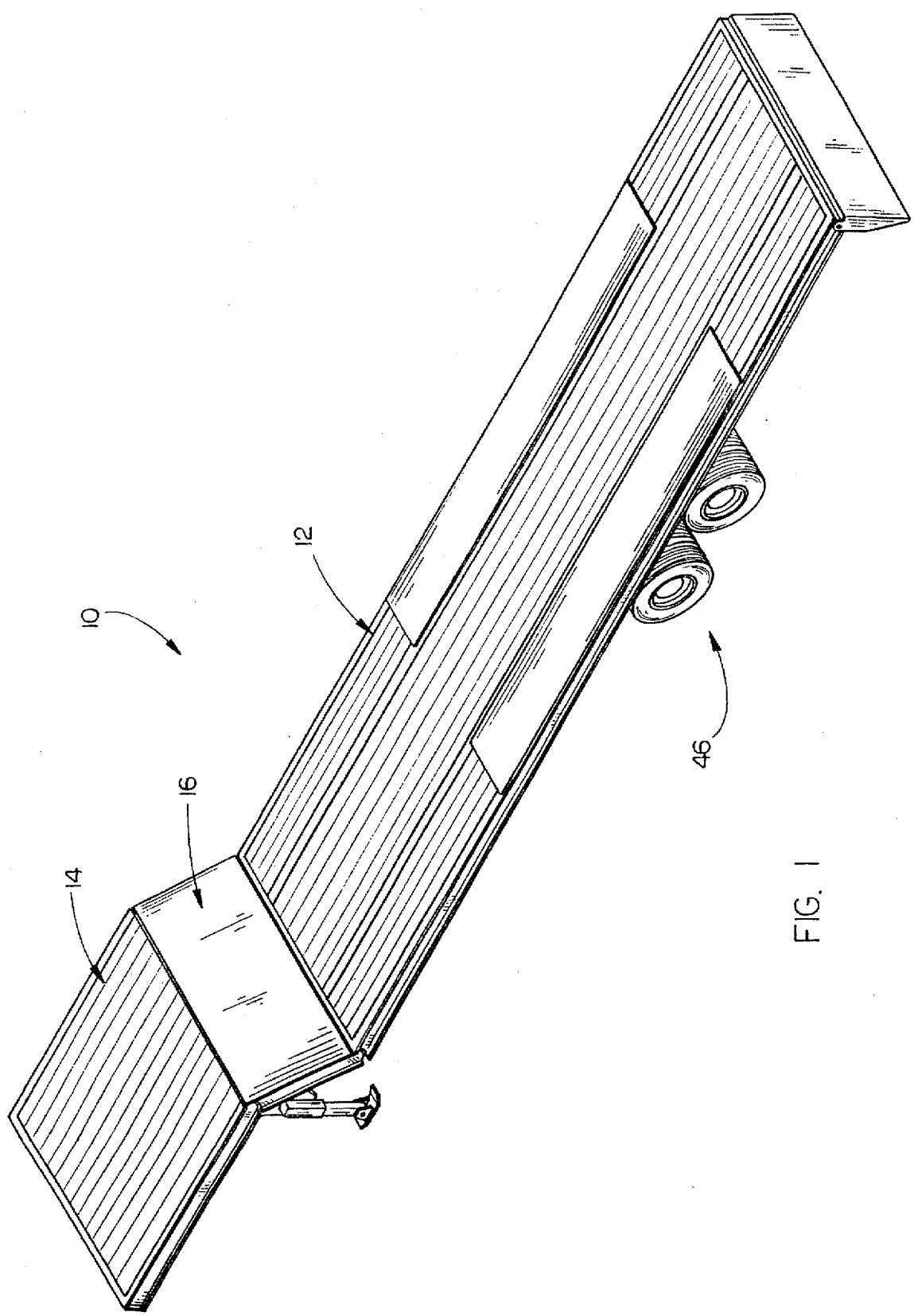
FIG. 1 is a rear perspective view of the trailer of this invention.

The trailer of this invention is referred to generally by the reference numeral 10 and is designed to be pulled by a conventional truck having a fifth-wheel trailer connection at the rearward end thereof. For purposes of description, trailer 10 will be described as comprising a main deck 12, upper deck 14 and deck ramp 16. Upper deck 14 includes a king pin 18 for connection to the fifth wheel of the prime mover in conventional fashion. Upper deck 14 also includes a conventional support system 20 for supporting the trailer when the trailer is disconnected from the truck.

Figure 8:
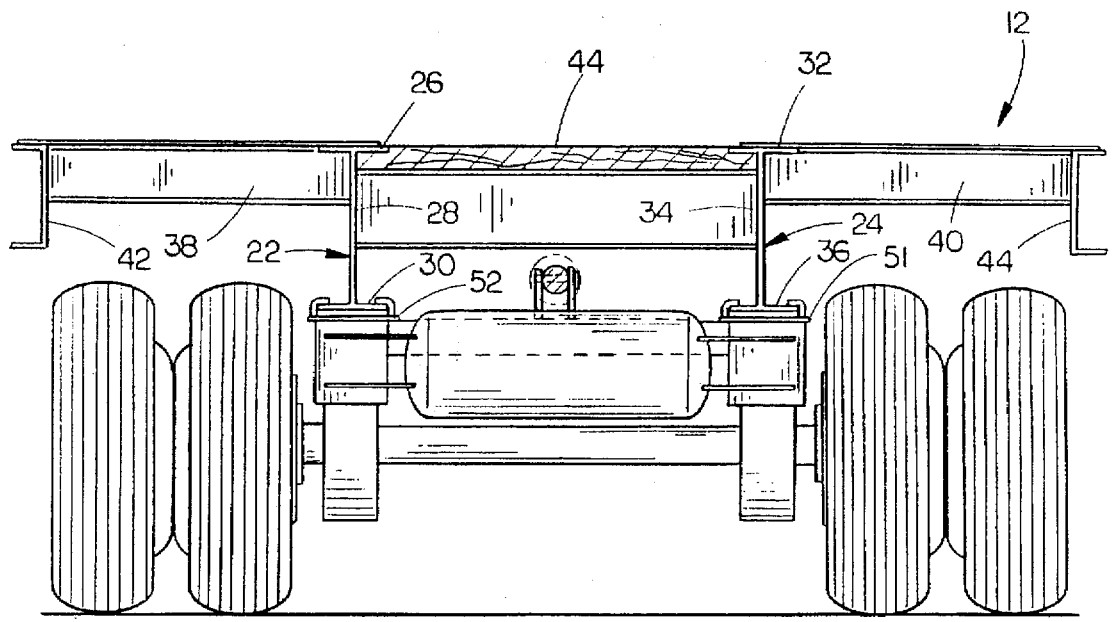
FIG. 8 is a transverse sectional view of the suspension system.

Main deck 12 includes at least a pair of longitudinally extending frame members 22 and 24, as best seen in FIG. 8. Frame member 22 includes a top flange 26, vertical web 28 and bottom flange 30. Similarly, frame member 24 includes a top flange 32, vertical web 34 and bottom flange 36. A plurality of transversely extending frame members 38 extend outwardly from frame member 22 and a plurality of transversely extending frame members 40 extend outwardly from frame member 24. Channel member 42 is secured to the outer ends of the frame members 38 while channel member 44 is secured to the outer ends of the frame members 40. Decking material 44 is secured to the upper surface of the main deck, as best seen in FIG. 8, in conventional fashion.

Figure 6:
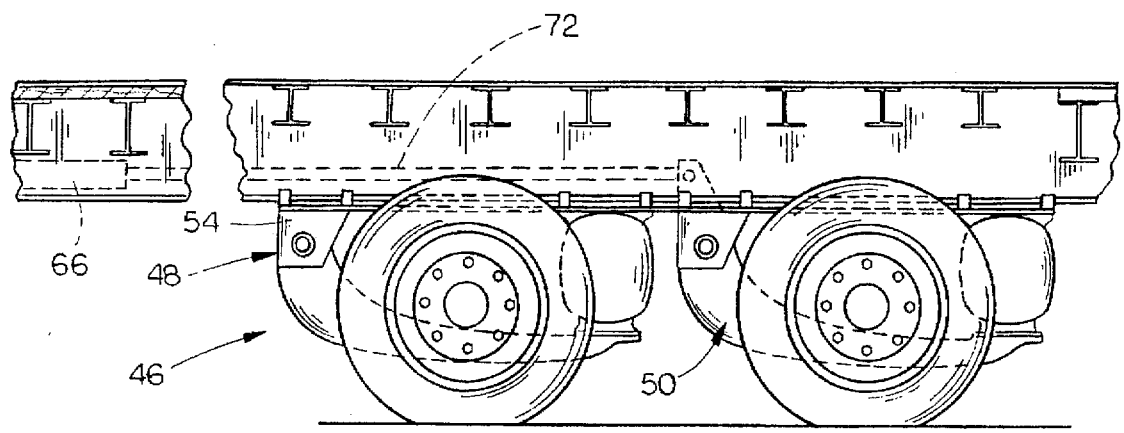
FIG. 6 is a side elevational view of the trailer illustrating the suspension system in its transport position.
Figure 9:
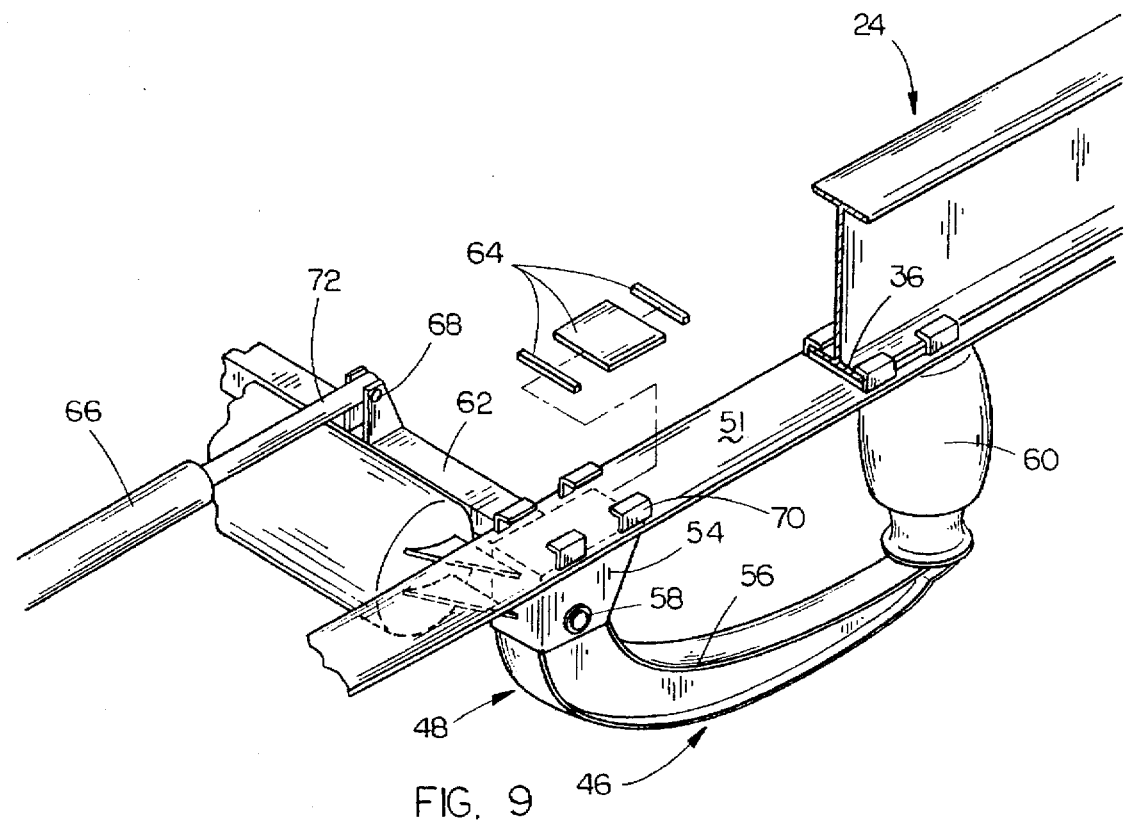
FIG. 9 is a partial perspective view of the suspension system.

The numeral 46 refers to a suspension system which is slidably mounted on the frame members 22 and 24 and which is substantially conventional in design except for the fact that it has been modified somewhat to enable it to be slidably mounted on the frame members 22 and 24. FIG. 6 illustrates the preferred embodiment wherein suspension system 46 includes a pair of suspension units generally identified by the reference numerals 48 and 50, although it should be understood that one, two, three or more suspension units could be utilized if so desired. Assuming that a pair of the suspension units 48 and 50 are utilized, the suspension system 46 is slidably mounted on the frame members 22 and 24 as will now be described. Suspension unit 48 includes an upper plate 51 which is positioned beneath bottom flange 36 of frame member 24 and an upper plate 52 which is positioned beneath bottom flange 30 of frame member 22. Inasmuch as each of the suspension units 48 and 50 are identical, only one of the suspension units 48 will be described in detail. As illustrated in FIG. 9, a bracket 54 is secured by welding to the underside of plate 51 and has a beam 56 pivotally secured thereto by means of pivot pin 58. Beam 56 extends rearwardly from the pivotal connection 58 and has a shock absorber or air bag 60 positioned between the rearward end thereof and the underside of plate 51. Suspension unit 48 also includes a bracket beam, and an air bag at the other side of the trailer identical to elements 54, 56 and 60, respectively. One or more cross-members 62 connect the suspension units at either side of the trailer. A plurality of low-friction pads 64 are positioned between the top of plate 51 and the underside of bottom flange 36 of frame member 24 to reduce the friction between the suspension unit and the associated frame member.

Hydraulic cylinder 66 is operatively connected to the frame members 24 and 26 at its forward base end and has its rod end pivotally connected to one of the cross-members 62 at 68. As seen in FIG. 9, plate 51 is provided with a plurality of retainer clips 70 which extend upwardly and inwardly therefrom for engagement with the outer ends of the bottom flange 36. The suspension unit 48, and the suspension unit 50 if utilized, includes a conventional axle and ground engaging wheels.

Figure 7:
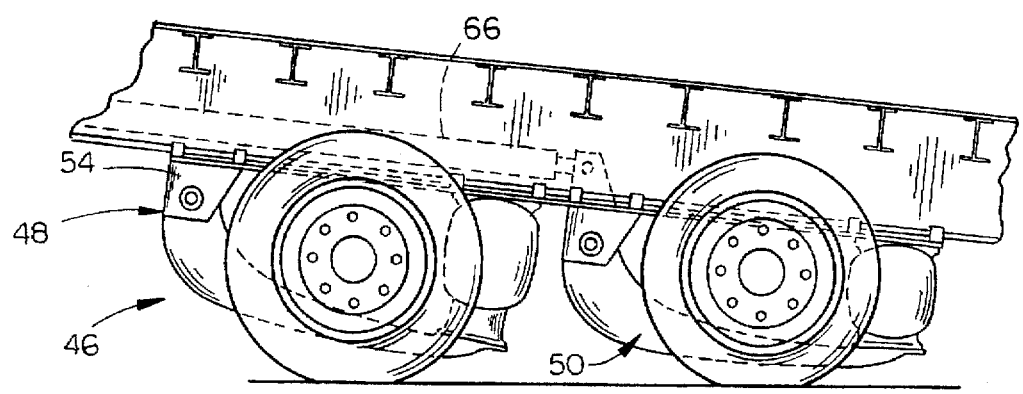
FIG. 7 is a view similar to FIG. 6 except that the suspension system has been moved forwardly from the position of FIG. 6 and the main deck has been pivotally moved.

Extension of the cylinder rod 70 from the hydraulic cylinder 66 causes the suspension system 46 to move rearwardly with respect to the trailer while retraction of the cylinder rod 70 causes the suspension system to move forwardly with respect to the trailer. Normally, the suspension system 46 will be in the transport position, illustrated in FIG. 6, with the cylinder rod 70 in its extended position. FIG. 7 illustrates the suspension system 46 having been slidably moved forwardly from the position of FIG. 6 so that the main deck 12 may be pivotally moved from the position of FIG. 1 to the position of FIG. 3.

Figure 4:
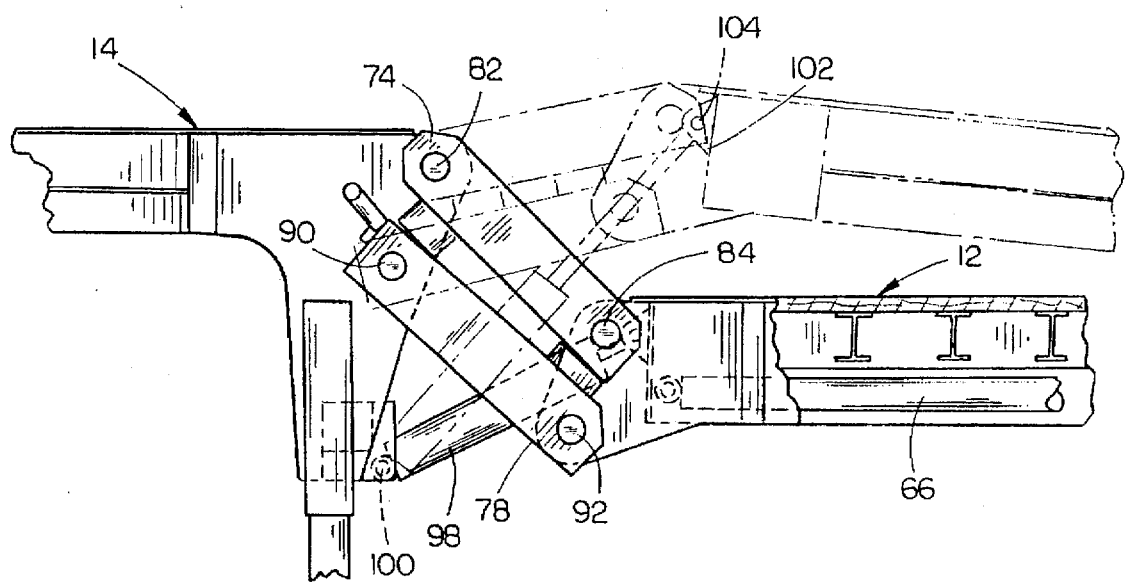
FIG. 4 is a cut-away view of the side of the multiple arms which interconnect the main deck and the upper deck.
Figure 5:
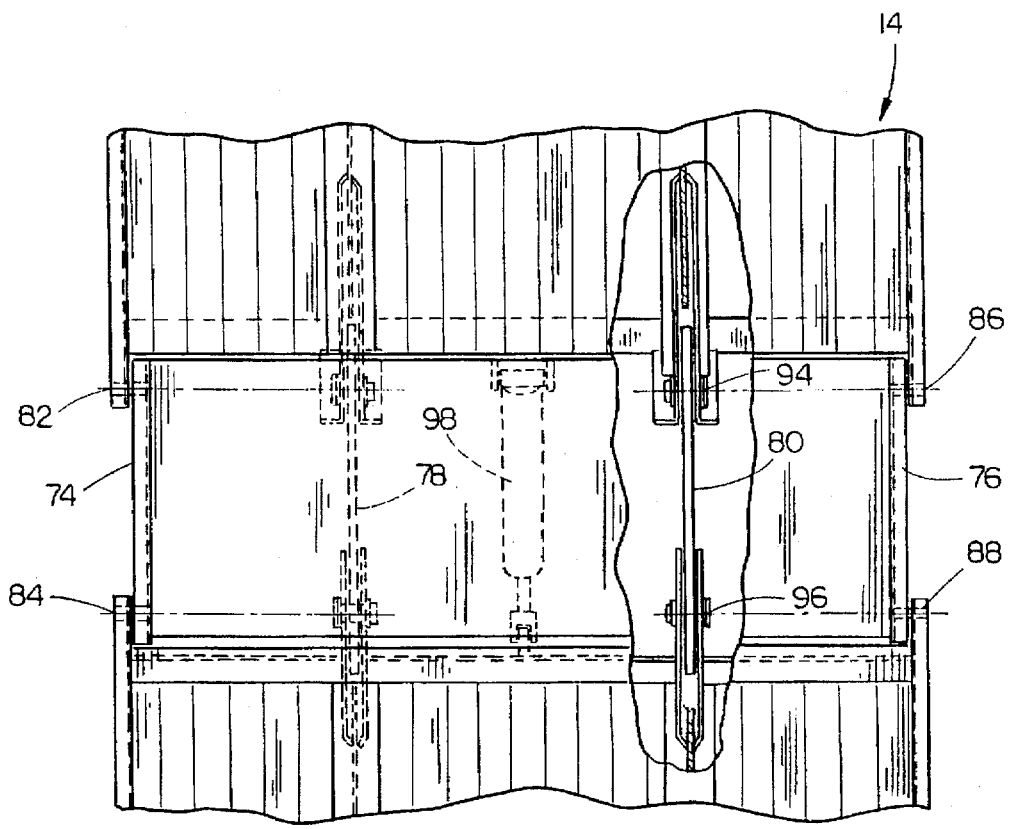
FIG. 5 is a top elevational view of the multiple arm connection between the main deck and the upper deck with portions thereof cut-away to more fully illustrate the invention.

Deck ramp 16 pivotally interconnects the forward end of the main deck 12 to the rearward end of the upper deck 14, as illustrated in the drawings. More specifically, deck ramp 16 includes at least a pair of upper arms 74 and 76 positioned at the opposite sides thereof and a pair of lower arms 78 and 80 positioned inwardly thereof as will be described in more detail hereinafter. Arm 74 is pivotally connected at its upper forward end to the rearward end of upper deck 14 at pivot point 82 while the lower rearward end thereof is pivotally connected to the upper forward end of main deck 12 at pivot point 84. The upper forward end of arm 76 is pivotally connected to the rearward end of upper deck 14 at pivot point 86 while the lower rearward end of arm 76 is pivotally connected to the forward end of main deck 12 at pivot point 88. Arm 78 is pivotally connected at its upper forward end to upper deck 14 at pivot point 90 and is pivotally connected at its lower rearward end to the forward end of main deck 12 by pivot point 92. As best seen in FIG. 4, arms 74 and 78 are not perfectly parallel inasmuch as the vertical distance between pivot points 82 and 90 is slightly greater than the vertical distance between pivot points 84 and 92. Although the preferred embodiment is to have the arms 74 and 78 not perfectly parallel, it is possible to have the arms 74 and 78 disposed in a parallel relationship although it is believed that such a relationship will not be as efficient as that disclosed.

The upper forward end of arm 80 is pivotally connected to upper deck 14 at pivot point 94 while the lower rearward end of arm 80 is pivotally connected to the forward end of main deck 12 at pivot point 96. Arms 78 and 80 are not perfectly parallel inasmuch as the vertical distance between pivot points 86 and 94 is greater than the vertical distance between pivot points 88 and 96.

Hydraulic cylinder 98 has its base end pivotally connected to upper deck 14 at 100 and has its rod 102 pivotally connected to the forward end of main deck 12 at 104. The extension of rod 102 from cylinder 98 causes the main deck 12 to be pivoted from the transport position illustrated by solid lines in FIG. 4 to the loading position illustrated by broken lines in FIG. 4.

The multiple arm connection between the upper deck and the main deck causes the upper deck 14 to remain in a substantially fixed or horizontal position when the main deck 12 is pivotally moved from the solid line position of FIG. 4 to the broken line position of FIG. 4. Without the multiple arm pivotal connection between the main deck 12 and the upper deck 14, pivotal movement of the main deck 12 with respect to the upper deck 14 would cause the upper deck 14 to move on its fifth wheel connection which could create various difficulties in the loading operation and which could cause damage to the fifth wheel connection.

Figure 2:
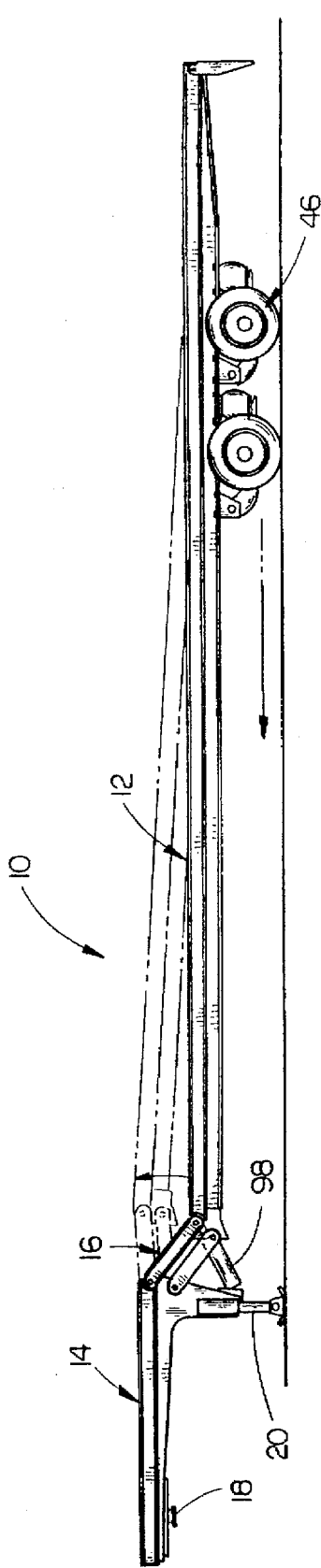
FIG. 2 is a side view of the trailer of this invention with the broken lines indicating the possible movement of the main deck with respect to the upper deck.
Figure 3:
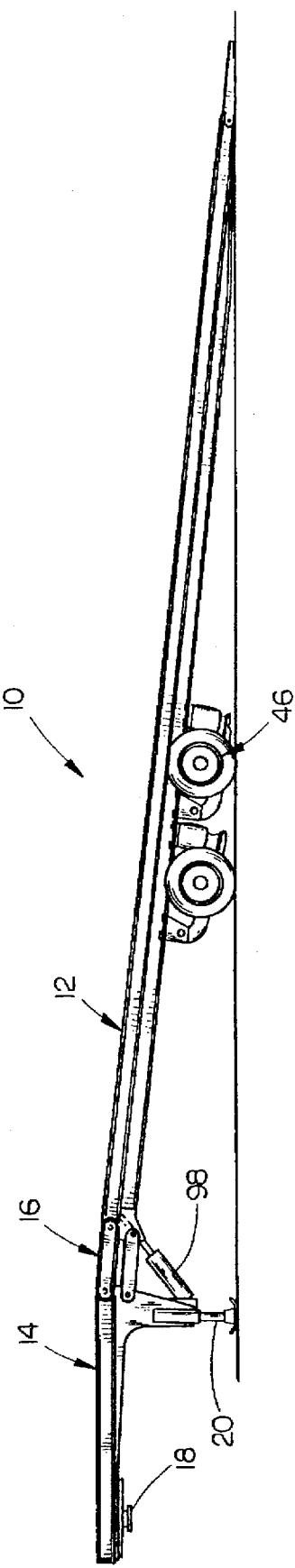
FIG. 3 is a view similar to FIG. 2, except that the suspension of the trailer has been moved forwardly from the position of FIG. 2 to enable the rearward end of the main deck to be moved into ground engagement.

When it is desired to move the trailer 10 from the transport position illustrated by solid lines in FIG. 2 to the loading position illustrated by solid lines in FIG. 3, hydraulic cylinder 66 is retracted which causes the suspension system 46 to be slidably moved forwardly on the trailer from the position of FIG. 2 to the position of FIG. 3. When the suspension system 46 has been moved to the position of FIG. 3, hydraulic cylinder 98 is then actuated to pivotally move the forward end of the main deck 12 upwardly, as illustrated in FIG. 3, until the rear end of the main deck 12 is in ground engagement, as illustrated in FIG. 3, to enable equipment or the like to be loaded onto the trailer. During the movement of the main deck 12 between the positions of FIG. 2 and FIG. 3, as previously described, upper deck 14 remains in the substantially horizontal position illustrated therein.

After the equipment has been loaded onto the trailer or unloaded therefrom, as the case may be, hydraulic cylinder 98 is then retracted to return the main deck to the position illustrated in FIG. 2. At that time, suspension system 48 is then moved rearwardly from the loading position of FIG. 3 to the transport position of FIG. 2.

Thus it can be seen that the invention accomplishes at least all of its stated objectives.

I claim:

1. A trailer, comprising:

a first longitudinally extending frame means having rearward and forward ends;

means at the forward end of said first frame means for connection to a prime mover;

said first frame means including at least first and second elongated and longitudinally extending frame members having rearward and forward ends;

each of said first and second frame members including a bottom flange, an upstanding web, and a top flange;

at least one first suspension system longitudinally slidably mounted on said first frame member;

at least one second suspension system longitudinally slidably movably mounted on said second frame member;

at least one transversely extending, elongated axle member secured to and extending between said first and second suspension systems;

at least one ground engaging wheel member at each end of said axle member;

said first suspension system including a top plate which is slidably positioned beneath said bottom flange of said first frame member;

said second suspension system including a top plate which is slidably positioned beneath said bottom flange of said second frame member;

at least one friction reducing slide pad positioned between each of said top plates and the associated frame member;

means for selectively slidably adjusting said first and second suspension systems with respect to said frame means;

a main deck supported on said first frame means and having rearward and forward ends;

an upper deck, having rearward and forward ends, positioned on said trailer forwardly and above said main deck;

said forward end of said main deck being pivotally secured to said rearward end of said upper deck;

means for pivotally moving said main deck with respect to said upper deck after said first and second suspension systems have been moved forwardly on said frame means;

and a deck ramp pivotally connecting the rearward end of said upper deck to the forward end of said main deck;

said deck ramp having rearward and forward ends and opposite sides;

the pivotal connection between said rear and main decks comprising at least a first pair of arms at one side of said deck ramp and at least a second pair of arms at the other side of said deck ramp;

each of said first and second pairs of arms including an upper arm and a lower arm having rearward and forward ends;

the forward ends of said arms being pivotally secured to said upper deck and the rearward ends of said arms being pivotally secured to said main deck.

2. The trailer of claim 1 wherein the vertical distance between the pivotal connections of said upper and lower arms with said upper deck is greater than the vertical distance between the pivotal connections of said upper and lower arms with said main deck.

3. A trailer, comprising:

a first longitudinally extending frame means having rearward and forward ends;

means at the forward end of said first frame means for connection to a prime mover;

said first frame means including at least first and second elongated and longitudinally extending frame members having rearward and forward ends;

at least one first suspension system longitudinally slidably mounted on said first frame member;

at least one second suspension system longitudinally slidably movably mounted on said second frame member;

at least one transversely extending, elongated axle member secured to and extending between said first and second suspension systems;

at least one ground engaging wheel member at each end of said axle member;

means for selectively slidably adjusting said first and second suspension systems with respect to said frame means;

a main deck supported on said first frame means and having rearward and forward ends;

an upper deck, having rearward and forward ends, positioned on said trailer forwardly and above said main deck;

said forward end of said main deck being pivotally secured to said rearward end of said upper deck;

means for pivotally moving said main deck with respect to said upper deck after said first and second suspension systems have been moved forwardly on said frame means;

and a deck ramp pivotally connecting the rearward end of said upper deck to the forward end of said main deck;

said deck ramp having rearward and forward ends and opposite sides;

the pivotal connection between said rear and main decks comprising at least a first pair of arms at one side of said deck ramp and at least a second pair of arms at the other side of said deck ramp;

each of said first and second pairs of arms including an upper arm and a lower arm having rearward and forward ends;

the forward ends of said arms being pivotally secured to said upper deck and the rearward ends of said arms being pivotally secured to said main deck.

4. The trailer of claim 3 wherein the vertical distance between the pivotal connections of said upper and lower arms with said upper deck is greater than the vertical distance between the pivotal connections of said upper and lower arms with said main deck.

* * * * *